(12) United States Patent
Reimann

(10) Patent No.: US 9,551,787 B2
(45) Date of Patent: Jan. 24, 2017

(54) PROCESS FOR THE DETERMINATION OF A POSITION CHANGE OR RESPECTIVELY RESTING AND/OR SPEED OF AN OBJECT

(75) Inventor: Ronne Reimann, Hamburg (DE)

(73) Assignee: Lambda:4 Entwicklungen GmbH, Hamburg (DE)

(*) Notice: Subject to any disclaimer, the term of this patent is extended or adjusted under 35 U.S.C. 154(b) by 237 days.

(21) Appl. No.: 14/349,491

(22) PCT Filed: Jan. 5, 2012

(86) PCT No.: PCT/EP2012/050159
§ 371 (c)(1),
(2), (4) Date: Jul. 24, 2014

(87) PCT Pub. No.: WO2013/079224
PCT Pub. Date: Jun. 6, 2013

(65) Prior Publication Data
US 2014/0327565 A1 Nov. 6, 2014

(30) Foreign Application Priority Data
Nov. 28, 2011 (EP) .................................. 11190927

(51) Int. Cl.
| G01S 13/58 | (2006.01) |
| G01S 5/02 | (2010.01) |
| G01S 11/02 | (2010.01) |
| G01C 21/16 | (2006.01) |
| G01S 13/84 | (2006.01) |

(52) U.S. Cl.
CPC ............. *G01S 13/58* (2013.01); *G01C 21/165* (2013.01); *G01S 5/02* (2013.01); *G01S 11/02* (2013.01); *G01S 13/84* (2013.01)

(58) Field of Classification Search
CPC ........ G01C 21/165; G01S 11/02; G01S 13/58; G01S 13/84; G01S 5/02
USPC ......................................................... 342/105
See application file for complete search history.

(56) References Cited

U.S. PATENT DOCUMENTS

| 6,167,347 A | 12/2000 | Lin | |
| 2003/0120425 A1* | 6/2003 | Stanley | G01C 21/165 701/500 |
| 2004/0054471 A1 | 3/2004 | Bartlett | |
| 2010/0321235 A1* | 12/2010 | Vossiek | G01S 13/9029 342/25 A |

FOREIGN PATENT DOCUMENTS

EP 2000818 12/2008

* cited by examiner

*Primary Examiner* — Timothy A Brainard
(74) *Attorney, Agent, or Firm* — Sand & Sebolt

(57) ABSTRACT

The present invention relates to a process for determining a position change or the resting and/or a speed of an object and a corresponding process for supporting an inertial measurement system. In the process at least one radio signal (FS) is received on the object (O) at at least one first and one second point in time, particularly continuously, and the change of the phase of said radio signal is determined for a determination of a relative movement between source (U) of said signal or a reference location and said object (O), and the relative movement between source (U) of said signal or the reference location and said object (O) is detected.

20 Claims, 2 Drawing Sheets

PROCESS FOR THE DETERMINATION OF A POSITION CHANGE OR RESPECTIVELY RESTING AND/OR SPEED OF AN OBJECT

TECHNICAL FIELD

The present invention relates to a process for the determination of a position change or respectively the resting and/or a speed of an object, or respectively to a corresponding process for the support of a measurement system, respectively of a system, particularly a navigation system, or respectively a corresponding installation.

BACKGROUND ART

Numerous processes for the determination of a position are known. Here measurements can be made on the basis of the signal-run time or the phase. In most cases, several measurements are carried out on signals or signal portions with different frequencies for the determination of a position, which signals or signal portions are received successively or simultaneously. For example, satellite based processes are known which are able to determine a position by an evaluation of radio signals. This is how on the basis of several measurements and the corresponding differences, position changes or respectively speeds, when taking into consideration the time periods elapsed between said measurements, can be determined.

Furthermore, also a determination of the relative speed is possible on the basis of the Doppler-effect.

It is also known, by means of so-called inertial sensors, to detect movements or respectively accelerations and to calculate such speeds or respectively distances as integrals and thus to detect corresponding changes which have taken place.

Many corresponding combinations of the described systems are known.

DISCLOSURE OF INVENTION

The object of the present invention, however, is to propose an alternative system which can provide reliable results with less effort, and which particularly makes a direct detection of a location change possible.

This object is solved by a process for the determination of a position change, the resting and/or a speed of an object, wherein at least one radio signal is received on said object at at least one first and one second point in time, particularly continuously, and the change of the phase of said radio signal is determined for the determination of a relative movement between source of the signal or a reference location and said object, and the relative movement between source of said signal or said reference location and said object is detected. The object is also solved by means of a process for the support of an inertial measurement system comprising at least one inertial sensor in which at least one radio signal is received and the change of the phase of said radio signal is determined to carry out a determination of a relative movement between source location of said radio signal or a reference location and the at least one inertial sensor; the relative movement between the source of said radio signal or the reference location and the inertial sensor is detected, the detected relative movement is provided to the inertial measurement system for an improvement of the position determination of said inertial sensor and/or for the correction of a drift of said inertial sensor. The object is further solved by a system, particularly an inertial navigation system, providing at least one inertial sensor; at least one radio-signal receiver for receiving at least one radio signal; a device for the execution of phase measurements on said at least one radio signal, and a device, arranged for the determination of relative movements between a source location of said at least one radio signal or a reference location and the system for improving the position determination of said inertial sensor and/or for correcting a drift of said inertial sensor. An installation including the aforementioned system and at least one emitter for emitting a radio signal may also be provided.

The present process is based on an evaluation of changes of the phase of a radio system in order to determine on its basis either a relative movement, or respectively to detect precisely the absence of such relative movement, the resting that is.

For this purpose, at least one radio signal is necessary which is received at the object. The change of the phase of the radio signal is then evaluated and, on such basis, a corresponding relative movement between the source location of the signal or a reference location and the object, or the absence of such movement is determined.

Therefore, the radio signal is received at least at one first point in time and one second point in time, and the phase change of the radio signal between the two points in time is used, in order to determine a corresponding relative movement, or respectively to detect the absence of such a movement.

Such a determination and/or detection can be carried out in several different ways. Thus, for example, a first phase measurement can be carried out and in the following an expected phase for a second point in time can be calculated, and at the second point in time, another phase measurement can be carried out on the radio signal, and the calculated expected phase can then be compared to the second phase measurement. If for example it was assumed in the calculation, that the object was resting, and thus a phase change was calculated solely on the basis of the time course of the radio signal and the time difference between said first and second points in time, the expected calculated phase and the phase as measured at the second point in time will correspond only, if no relative movements between said source location, or respectively reference location and the object has occurred. This excludes movements which lie on equiphase lines, or respectively which are exactly fashioned such that the movement between the measurements causes a phase shift by $2\pi$.

Such ambiguities, however, can be avoided by means of several measurements or measurements on different radio signals or portions thereof, particularly originating from different relative directions in relation to the object.

Advantageously, at least two radio signals are evaluated on the object, which arrive at the object particularly from different directions, particularly providing an angular deviation of at least 10°.

If the phase shifts, this however can also be due to a modified environment or respectively due to a modified environment between source location, reference location and/or object, or it can be due to environment modifications respective to the propagation channel. Thus in spite of a phase shift, resting of the objects can be possible. This, however, normally is harmless, because in such a case for example, certainly no drift correction is carried out, but no error will be caused either as regularly a correction or influence might only be conducted if a resting is detected. Furthermore, such situations can often be detected by a correspondingly intelligent evaluation and/or the use of several radio/reference signals.

Instead of going through a corresponding extrapolation of the expected phase, also a reference oscillator providing the identical signal course as the radio signal can be used, in order to achieve a corresponding reference for the comparison with such a reference oscillator.

It is also possible that a particular movement is assumed and then taken into consideration in the calculation of the expected phase. If then the second phase measurement and the expected phase deviate from each other, the assumed movement would not be identical with the actual one.

As a matter of principle, it is also conceivable that conclusions be drawn from the deviations between the expected phases (expected reference-phases) and the phases as measured, on the deviation between the assumed movement and the actual one.

By way of such a process, movements and particularly the resting state of an object can be detected in a simple way. This also is the case in particular, if the environment is complex and otherwise multi-pathing effects would make corresponding distance determinations difficult if not impossible.

For example, at a frequency of 2.4 gigahertz, that is at a wavelength of approximately 12 cm, a movement-detection accuracy of 3 mm can be reached with an accuracy of the phase measurement of only 10°. In a process type which uses an object signal with the error of the phase measurement remaining the same, the accuracy doubles. Thus the process makes a highly sensitive detection possible along with a simple procedure and the use of simple hardware.

It is also possible to carry out such process using existing signals. Basically the course of the signal can be any course signal. It is, however, necessary to know the course of the signal over time for an exact calculation. Here it is also possible to learn about it later, for example it can be reconstructed from the signal itself. This is possible, for example, when the signal itself contains information about the signal course, or if it makes it possible to determine the radio-signal course.

The form/course of the radio signal is thus advantageously known or can be reconstructed from known or respectively determined information. That facilitates the corresponding comparison. Otherwise, on the basis of the preceding path, assumptions on the further path of the radio signal are to be made, and on such basis a corresponding execution of the process is to be initiated. However, this involves inaccuracies and uncertainties.

In the simplest of all cases, the radio signal constitutes a sinus signal with a constant frequency and particularly also amplitude. In that case a corresponding execution is particularly simple. However, also any other radio signals can be used. For example, it is conceivable that radio signals with several signal portions of different frequencies are used, which can consist of a superposition of several sinus signals with different frequencies for example. This is how several measurement values can be obtained at the same time.

It is also possible that as a radio signal at least one, particularly exclusively in the environment existing radio signal can be used. This is how for example DVBT signals, WIFI signals, mobile radio signals or VHF signals can be used exclusively or with other signals together as radio signals and can be used for a corresponding execution of the process.

In a preferred embodiment, which allows for a particularly simple evaluation, thus a pure sinus signal or at least a sinus signal portion of a signal is used as radio signal.

In a possible embodiment, all the radio signals originating from one source location which are being used, especially all the radio signals used, in particular all the signals, radio signals, reference-radio signals, object signals used provide only one frequency. Here the frequencies do not need to be absolutely identical. A deviation in the amount of up to 2 kHz or 0.001%, particularly 1 kHz or 0.0005% is usually harmless. This makes a particularly simple and reliable construction possible.

In a particularly simple embodiment, only the deviation from the continuity of the radio signal, particularly of a carrier signal, that is of a pure sinus wave or respectively a pure sinus portion is determined, and is used for the determination of the relative movement between the source of the signal and the object. Continuity of the radio signal means the continuous change of a signal, for example a sinus wave, measured at one location. Such continuity would for example be interrupted, when the object is moving.

Advantageously, the source location of the at least one radio signal rests, or it moves uniformly, or the movement of the source location is known, respectively can be reconstructed from measured and/or transmitted information, such that it can be taken into account in the corresponding comparison or respectively calculation.

Also more complex process arrangements are possible. Thus for example it is conceivable that a first and second reference-phase measurement is carried out at a first reference time and at a second reference time, on at least one reference radio signal, coming from a reference location which is remote from the source location, besides the first and the second phase measurement at the first and second point in time, on at least one radio signal coming from the source location.

In such process, the at least one reference radio signal provides a known and/or transmitted phase relation to the at least one radio signal. Here it is crucial that the phase relation between the radio signal, on which the n-th phase measurement is carried out, and the reference radio signal, on which the associated, particularly n-th reference-phase measurement is executed, be known. This can be done in several different ways. If the phase measurements are carried out on uncorrelated radio signals or if the reference-phase measurements are carried out on uncorrelated reference signals, it is necessary that per phase-measurement reference phase-measurement tuple one individual phase relation be known and be taken into account. If the radio signals and reference signals are correlated, and the source location and reference location are arranged constantly relatively to each other in terms of space, it is possible to work with one known phase relation, because it applies to all the phase-measurement-reference phase measurement tuples.

This is how, with an assumed movement and/or resting state of the object, an expected phase for the second point in time of the second phase measurement and an expected reference-phase on the basis of the first phase measurement, the time difference between the first and second points in time, the phase relation(s), the first reference-phase measurement and the difference between the first reference time and the second reference point in time can be determined. Thus, the expected phase and the expected reference-phase, in particular their sum and/or difference can be compared to the second phase measurement and the second reference-phase measurement, particularly to their sum and/or difference. This allows to draw a conclusion on the assumption concerning the movement respectively resting state being correct.

Particularly advantageously, the interval between the respective phase measurement and the respective reference-phase measurement is constant. Advantageously thus the interval between the first phase measurement and the first reference-phase measurement equals the interval between the n-th phase measurement and n-th reference-phase measurement.

Furthermore, the change of the phase can also be detected by means of a procedure, in which a first object signal is emitted by the object and the first object signal is received at the reference location and/or source location of the at least one radio signal, and a possibly existing frequency difference between the first object signal and the radio signal received at the first point in time is determined, and a first phase difference between the first object signal at the object and the radio signal received at the first point in time at the object, and a second phase difference between the first object signal at the reference location and/or source location and the radio signal at the reference location and/or source location is determined, and such process is repeated for a second object signal and a radio signal received at the second point in time, and the phase measurement relating to the first object signal is compared to the one relating to the second object signal.

If deviations develop in such process, most probably a movement has occurred. If the environment is unchanged, a movement can be assumed with certainty. From the deviations, often information on the movement can be gained, by evaluating their extent or by comparing them to other assumptions on the movement.

Also probabilities or probability ranges for the corresponding states, such as for example the resting of the object can be calculated and used.

Certainly, similar measurement arrangements are known to allow for the determination of the distance or respectively, by calculating from two or more measurements, the change of distance, however, in practice it is often not possible to measure absolute values within short measurement periods, with limited computer capacity and/or corresponding arrangements as described here. But as the inventor recognized a decision on resting or non-resting, or on the correctness of an assumed movement, however, is possible also in a complex environment by means of the present process and the simple arrangement as described.

Thus the process can be used to particular advantage, when no absolute position determination or distance determination on the basis of the electromagnetic signals, radio signal, object signal and reference signal is carried out, particularly, if for example no possibility for a corresponding evaluation is given. It is particularly advantageous to use the process, when the at least one received radio signal, the reference radio signal and/or the object signals are not suited for an absolute position determination and/or distance determination, particularly not on the basis of particularly two phase measurements, especially not within a time period of 1 second, particularly 100 milliseconds. This can be due to the type of radio signals themselves, for example, when the available frequency band is correspondingly limited. Usually however, this is rather due to the complexity of the environment, in which the radio signals then do not allow for such a determination. Another possible reason for such determination not being possible can also be due to the limited hardware used, or respectively the accuracy or resolution of the components used or the time that is available.

It is particularly advantageous, to carry out the process in such a way that at the object at least one measurement value of at least one inertial sensor is performed, and the detected relative movement is used for improving the position determination of the inertial sensor and/or for correcting a drift of the inertial sensor. Based on the knowledge of whether the object/sensor is resting or non-resting, or respectively by way of checking the correctness of the assumed movement a corresponding drift correction can be carried out particularly reliably, which can improve the accuracy of the measurement values as derived from the inertial sensor.

With particular advantage thus, in a combination with at least one inertial sensor a correction of the drift of the inertial sensor, or respectively a corresponding calibration is carried out, when resting and/or a uniform movement of the inertial sensor or respectively of the object are determined. This is how clearly better measurement results, particularly for speed and position can be generated based on an inertial sensor.

In a special embodiment, the process can be carried out in such a way that the process comprises the emission of the at least one radio signal from at least one source location which is spatially not coupled to the object, and especially also the emission of the reference-radio signal. Certainly, also the signals in the environment can be used, however, with a specific emission, as an integral part of the process, in many cases a higher accuracy and reliability can be achieved.

The object also is solved by way of a process for supporting an inertial measurement system, providing at least one inertial sensor, in which at least one radio signal is received in a location spatially coupled to said inertial sensor and the change of the phase location of said radio signal is determined for a determination of a relative movement between the source location of said radio signal or a reference location and the at least one inertial sensor. In such process, the relative movement between source location of the radio signal or a reference location and the at least one inertial sensor is detected and the detected relative movement is provided to the inertial measurement system, for improving the position determination of the inertial sensor and/or for correcting a drift of the inertial sensor. The detection of relative movement includes the detection of resting which is relative movement with the value zero. The latter is particularly suitable for correcting a drift. Such process offers a simple way to provide an inertial system with corresponding information for improving the measurement or, respectively, correction of the drift. Here the process also can be part of the measurement process of the inertial measurement system itself, or it can transmit or provide the corresponding information as a separate component to the inertial measurement system.

Advantageously it is possible for example to use a corresponding Kalman-Filter for combining the determination of the phase change and the measurement values of the inertial sensor, for example in order to improve the measurements of the inertial sensor or of the inertial measurement system. Also probabilities or probability ranges for the corresponding states such as for example the resting of the object can be calculated and used.

The above described advantageous embodiments can also be applied here. This holds true in particular for the different possibilities of determining a relative movement or, respectively the change of the phase.

The object is also solved by means of a system, particularly an inertial navigation system, providing at least one inertial sensor and at least one radio signal receiver for receiving at least one radio signal as well as a device for executing phase measurements on the at least one radio signal and a device arranged to determine relative movement between a source location of the at least one radio signal or a reference location and the system for an improvement of the measurements of the inertial sensor, or based on the inertial sensor and/or for the correction of a drift of the inertial sensor. Determination of the relative movement also includes the determination of resting. Such a determination of resting is particularly suited for the correction of a drift.

Advantageously, in order to combine the determination of the phase change and of the measurement values of the inertial sensor, for example for improving the measurements of the inertial sensor or of the inertial measurement system, a corresponding Kalman-filter can be used. It is also possible to calculate and use probabilities or probability ranges for the corresponding states, such as for example the resting of the object.

The other process features as described can also be implemented in the system correspondingly, for example by providing a corresponding control means for example for executing/controlling the process steps. This applies particularly also to the different ways of determining a change of the phase or respectively of a relative movement or of resting. The active steps executed on the object can also be implemented correspondingly in the system, for example by providing a corresponding emission device.

The object is also solved by means of a installation consisting of at least one emitter for the emission of a radio signal at a source location, optionally of at least one emitter and/or receiver device in at least one reference location, and at least one system, particularly an inertial navigation system, providing at least one inertial sensor; at least one radio-signal receiver for receiving at least one radio signal; a device for the execution of phase measurements on said at least one radio signal; and a device, arranged for the determination of relative movements between a source location of said at least one radio signal or a reference location and the system for improving the position determination of said inertial sensor and/or for correcting a drift of said inertial sensor. Such an installation provides a comprehensive infrastructure which can make use of the advantages of the present invention. Also all the process features as described can be applied correspondingly. Thus for example, the emitter can be arranged correspondingly, for example to emit a sinus wave or a superposition of such. Furthermore also a corresponding control means for controlling the components of the installation in the source location and/or in the reference location can be provided.

Advantageously the installation provides at least two emitters, the radio signals of the emitters being in a phase relation with each other at at least one point in time, respectively is communicated to the system or can be determined by it, particularly from the radio signals. Such a installation provides a particularly well suited infrastructure with a corresponding system and thus is able to put the advantages of the invention to particularly good use. Advantageously, more than two emitters are provided, the phase relation of which are correspondingly known or can be determined. Here it is of advantage that the emitters be spaced apart from each other, particularly at least a plurality of wave lengths of the radio signals used. Particularly, they are distributed in such a way that in the intended dwelling area of the system or the systems at least three emitters can be seen from any location with angular differences of at least 10°. Such a distribution of the emitters provides for a particularly good coverage, which allows for a particularly accurate and efficient process to be carried out on the system.

Further details and advantages embodiments shall be described on the basis of the embodiments given in the following as purely exemplary descriptions along with the purely schematic drawings.

MODE(S) FOR CARRYING OUT THE INVENTION

Figure 1:
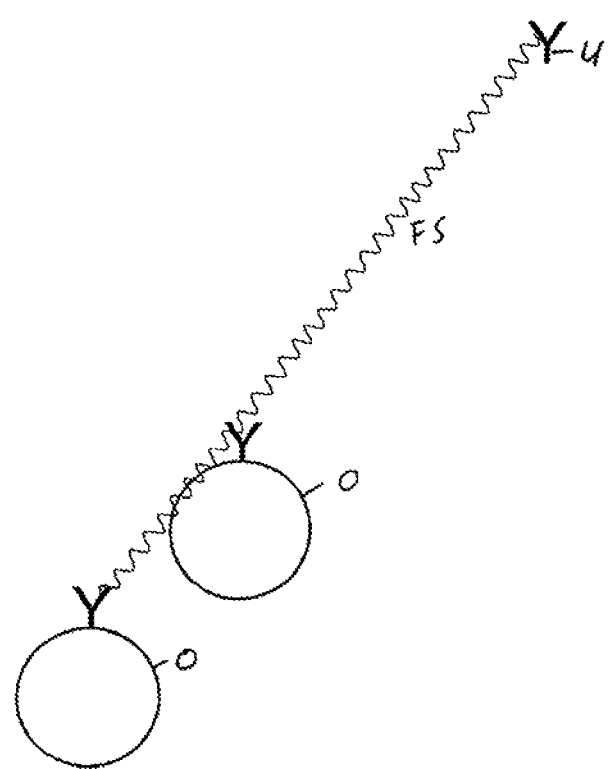
FIG. 1 a representation of a simple measurement arrangement.

FIG. 1 shows an antenna Y in a source location U as well as two representations of objects O, respectively with antennas Y. Also a radio signal FS is shown which is emitted by the antenna Y at the source location U and which is received by antenna Y on the object O. It can be seen that in a different position of the object O the location of the antennas Y of the object O is changed in relation to the radio signals FS. Thus, if the point in time is constant, a different phase location is measured.

Figure 2:
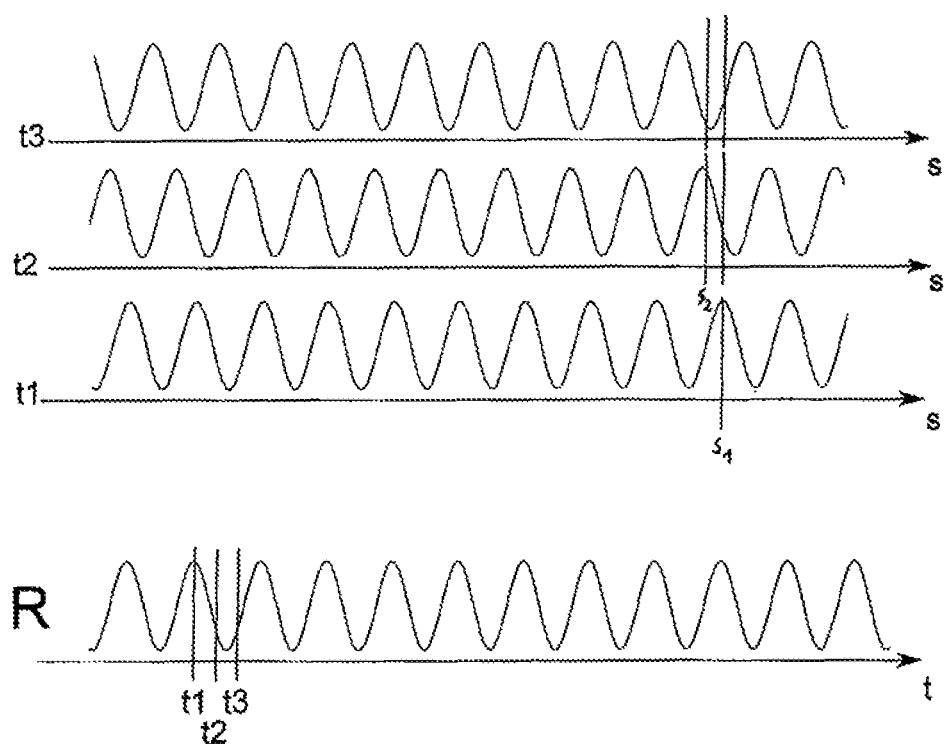
FIG. 2 a representation of the corresponding measurement values.

Such a change is shown in FIG. 2. FIG. 2 first shows three location axes s relating to the different points in time t1, t2 and t3. Positions s1 and s2 are designated. If an object is resting in position s1, the phases as measured can be read out from the individual diagrams at the points in time t1, t2 and t3. If the object changes its position for example to location s2, the correspondingly marked phases are measured at the points in time t2 and t3. These deviate from the phases as measured at the object in locations s1 at the points in time t2 and t3. This is how a change in the object location moving away from s1 can be detected.

Below the three diagrams mentioned another reference oscillation R is shown on a time axis t. Also the points in time t1, t2 and t3 are marked. Here the special case was chosen in which the reference oscillator R is synchronized with the radio signal in location s1 at the point in time t1. In such a case the phases as measured in the object location s1 at the different points in time t1, t2, t3 correspond to the phases measured on the reference oscillator R at the points in time t1, t2, t3. This can be seen in FIG. 2.

If the object location changes from point in time t1 from location s1 towards location s2 at the point in time t2 and point in time t3, a comparison of the phases measured at location s2 at the points in time t2 and t3 would show a deviation with respect to the phases of the reference oscillator R at the points in time t2 and t3, which can also be understood from FIG. 2.

Further advantageous embodiments and adaptations to the individual cases of application can easily be found by the person skilled in the art.

LIST OF REFERENCES

U source location
O object
Y antenna
FS radio signal
R reference oscillator

The invention claimed is:
1. A process for the determination of a position change or a resting or a speed of an object, wherein at least one radio signal is received on said object at at least one first and one second point in time and a change of the phase of said radio signal is determined for the determination of a relative movement between source of the signal or a reference location and said object; and the relative movement between source of said signal or said reference location and said object is detected; and wherein the change of the phase is detected by:

a. a first and a second phase measurement being carried out at said different first and second points in time on said at least one radio signal originating from said source location; and b. at least one first and one second reference phase measurement being carried out at a first reference-point in time and at a second reference-point in time on at least one reference-radio signal coming from said reference location which is spaced apart from said source location, wherein said at least one reference-radio signal presents one known or transmitted phase relation to the at least one radio signal; and c. with an assumed movement or resting of said object it is determined an expected phase for said second point in time of said second phase measurement, and an expected reference-phase on the basis of said first phase measurement, the time difference between said first and said second points in time, the phase relation(s), the first reference-phase measurement and the time difference between said first reference-point in time and said second reference-point in time; and wherein d. said expected phase and said expected reference-phase measurement, is compared to said second phase measurement and said second reference-phase measurement.

2. The process according to claim 1, wherein said source location of said at least one radio signal is resting, is moving uniformly or the movement of said source location is known, or is reconstructed from gathered or transmitted information.

3. The process according to claim 1, wherein at least on the detection of a stationary position or of a uniform movement of at least one inertial sensor a correction of a drift of said at least one inertial sensor is carried out.

4. The process according to claim 1, wherein no absolute position determination or distance determination is carried out on the basis of the electromagnetic signals.

5. The process according to claim 1, wherein a pure sinusoidal signal or a sinusoidal portion of a signal is used as a radio signal.

6. The process according to claim 1, wherein the deviations from the continuity of said radio signal are determined and are used for the determination of the relative movement between the source of said signal and said object.

7. The process according to claim 1, wherein said process comprises the emission of the at least one radio signal from at least one source location which is spatially not coupled to said object.

8. The process according to claim 1, wherein the at least one first and one second reference phase measurement is carried out at the first reference-point in time and at the second reference-point in time on two reference-radio signals coming from said reference location.

9. The process according to claim 1, wherein no absolute position determination or distance determination is carried out within a time range of 1 second.

10. A process for the determination of a position change or a resting or a speed of an object, wherein at least one radio signal is received on said object at at least one first and one second point in time and a change of the phase of said radio signal is determined for the determination of a relative movement between source of the signal or a reference location and said object; and the relative movement between source of said signal or said reference location and said object is detected; and wherein the change of the phase is detected by:

a. emitting a first object signal from said object;

b. said first object signal being received at said reference location or source location of said at least one radio signal;

c. a possibly existing frequency difference between said first object signal and said radio signal which is received at said first point in time is being determined; and d. a first phase difference between said first object signal at said object and the radio signal which is received at said first point in time at said object and a second phase difference between said first object signal at the reference location or said source location and said radio signal at the reference location or source location being determined; and e. such process being repeated for a second object signal and a radio signal received at said second point in time; and f. said phase measurements with reference to said first object signal being compared to those with reference to said second object signal.

11. The process according to claim 10, wherein the shape of said radio signal is known or can be reconstructed from known, respectively gathered or transmitted information.

12. The process according to claim 10, wherein at least on the detection of a stationary position or of a uniform movement of at least one inertial sensor a correction of a drift of said at least one inertial sensor is carried out.

13. The process according to claim 10, wherein no absolute position determination or distance determination is carried out within a time range of 1 second.

14. A process for the determination of a position change or a resting or a speed of an object, wherein at least one radio signal is received on said object at at least one first and one second point in time and a change of the phase of said radio signal is determined for the determination of a relative movement between source of the signal or a reference location and said object; and the relative movement between source of said signal or said reference location and said object is detected; and wherein at least one measurement value of at least one inertial sensor is gathered and the determined relative movement is used for improving the position determination of said inertial sensor or for correcting a drift of said at least one inertial sensor.

15. The process according to claim 14, wherein the shape of said radio signal is known or can be reconstructed from known, respectively gathered or transmitted information.

16. The process according to claim 14, wherein at least on the detection of a stationary position or of a uniform movement of said at least one inertial sensor a correction of the drift of said at least one inertial sensor is carried out.

17. The process according to claim 14, wherein no absolute position determination or distance determination is carried out within a time range of 1 second.

18. A process for supporting an inertial measurement system comprising at least one inertial sensor:

a. in which at least one radio signal is received and the change of a phase of said at least one radio signal is determined to carry out a determination of a relative movement between a source location of said at least one radio signal or a reference location and the at least one inertial sensor;

b. a relative movement between the source of said at least one radio signal or the reference location and the at least one inertial sensor is detected;

c. the detected relative movement is provided to the inertial measurement system for an improvement of the position determination of said at least one inertial sensor or for the correction of a drift of said at least one inertial sensor; and wherein the change of the phase is detected by:

d. a first phase measurement and a second phase measurement being carried out at different first and second points in time on said at least one radio signal originating from said source location; and e. at least one first reference phase measurement and at least one second reference phase measurement being carried out at a first reference-point in time and at a second reference-point in time on at least one reference-radio signal coming from said reference location which is spaced apart from said source location, wherein said at least one reference-radio signal presents one known or transmitted phase relation to the at least one radio signal; and f. with an assumed movement or resting of said object it is determined an expected phase for said second point in time of said second phase measurement, and an expected reference-phase on the basis of said first phase measurement, a time difference between said first and said second points in time, the phase relation(s), the first reference-phase measurement and the time difference between said first measurement and the time difference between said first reference-point in time and said second reference-point in time; and wherein g. said expected phase and said expected reference-phase measurement are compared to said second phase measurement and said second reference-phase measurement.

19. A system providing:

a. an object comprising at least one inertial sensor;

b. at least one radio-signal receiver for receiving at least one radio signal and at least one reference signal;

c. a device for the execution of phase measurements on said at least one radio signal and on the at least one reference signal; and d. a device, arranged for the determination of relative movements between a source location of said at least one radio signal or a reference location and the system object for improving the position determination of said at least one inertial sensor or for correcting a drift of said at lease one inertial sensor; and wherein determination of the relative movements comprises:

e. a first phase measurement and a second phase measurement carried out at different first and second points in time on said at least one radio signal originating from said source location; and f. at least one first reference phase measurement and at least one second reference phase measurement carried out at a first reference-point in time and at a second reference-point in time on at least one reference-radio signal coming from said reference location which is spaced apart from said source location, wherein said at least one reference-radio signal presents one known or transmitted phase relation to the at least one radio signal; and g. with an assumed movement or resting of the object it is determined an expected phase for said second point in time of said second phase measurement, and an expected reference-phase on the basis of said first phase measurement, the time difference between said first and second points in time, the phase relation(s), the first reference-phase measurement and the time difference between said first reference-point in time and said second reference-point in time; and wherein h. said expected phase and said expected reference-phase measurement is compared to said second phase measurement and said second reference-phase measurement.

20. An installation consisting of at least one emitter for emitting a radio signal and a reference signal and at least one system according to claim 19.

* * * * *